United States Patent
Ma et al.

(10) Patent No.: US 8,648,806 B2
(45) Date of Patent: Feb. 11, 2014

(54) FOLDABLE MOUSE

(75) Inventors: Mou-Ming Ma, New Taipei (TW);
Shu-I Chen, New Taipei (TW)

(73) Assignee: Giga-Byte Technology Co., Ltd., New Taipei (TW)

( * ) Notice: Subject to any disclaimer, the term of this patent is extended or adjusted under 35 U.S.C. 154(b) by 281 days.

(21) Appl. No.: 13/109,005

(22) Filed: May 17, 2011

(65) Prior Publication Data

US 2012/0169600 A1     Jul. 5, 2012

(30) Foreign Application Priority Data

Dec. 29, 2010    (TW) ................................ 99146633 A

(51) Int. Cl.
*G06F 3/033*     (2013.01)
(52) U.S. Cl.
USPC ............ 345/163; 345/165; 345/166; 345/169
(58) Field of Classification Search
None
See application file for complete search history.

(56) References Cited

U.S. PATENT DOCUMENTS 6,970,156 B1 * 11/2005 Silverstein ..................... 345/163
2005/0116933 A1 * 6/2005 Huang et al. .................. 345/163

FOREIGN PATENT DOCUMENTS

| JP | 10133813 | 5/1998 |
| JP | 2000029625 | 1/2000 |
| WO | 2006013343 | 2/2006 |

\* cited by examiner

*Primary Examiner* — Joseph Haley
*Assistant Examiner* — Ifedayo Iluyomade
(74) *Attorney, Agent, or Firm* — Chun-Ming Shih

(57) ABSTRACT

A foldable mouse including a first bottom plate, a second bottom plate, a first top plate, a second top plate, and two flexible side edge covers is provided. The first bottom plate and the second bottom plate are partially stacked together, and are suitable for relative movement. The first top plate has a first end and a second end, in which the first end pivots to a side of the first bottom plate away from the second bottom plate. The second top plate has a third end and a fourth end, in which the fourth end pivots to a side of the second bottom plate away from the first bottom plate. The two flexible side edge covers are connected to two side edges of the first top plate and the second top plate and two side edges of the first bottom plate and the second bottom plate.

9 Claims, 4 Drawing Sheets

FOLDABLE MOUSE

CROSS-REFERENCE TO RELATED APPLICATION

This application claims the priority benefit of Taiwan application serial no. 99146633, filed Dec. 29, 2010. The entirety of the above-mentioned patent application is hereby incorporated by reference herein and made a part of this specification.

BACKGROUND OF THE INVENTION

1. Field of the Invention

The present invention generally relates to a mouse, in particular, to a foldable mouse having a folding function.

2. Description of Related Art

A mouse, as an input device used with Windows interface applications, may control a display position of a cursor on a screen, and open the applications or perform other relevant functions by clicking functional keys. Currently, for the population of using personal computers, the mouse is the most common input device next to the keyboard.

The mouse can be used in a desktop or notebook computer. Although the cursor control on the screen of the notebook computer may be replaced by a touch pad disposed on the computer body, most users are used to using the notebook computer in combination with the mouse. Therefore, it is common that users additionally install the mouse for use.

A currently common mouse may be a mouse connected to a computer through a signal transmission line for use or a wireless mouse using a wireless transmission manner without any transmission line. The wireless mouse is not restricted by the transmission line in operation, and thus is movable in a wider range. In spite of the small volume of the mouse, in order to conform to ergonomics, the mouse is usually thick in appearance, so as to provide a comfortable grip feeling for users. However, the thick appearance of the mouse usually causes trouble in carrying or receiving. Especially when the mouse is carried with a notebook computer to be used outside, as the mouse is received in a special receiving bag of the notebook computer, the mouse occupies a lot of space, and if the thickness of the bag is insufficient, the bag bulges out, thereby affecting the appearance.

SUMMARY OF THE INVENTION

Accordingly, the present invention is directed to a foldable mouse convenient to be received or carried.

The present invention provides a foldable mouse, which includes a first bottom plate, a second bottom plate, a first top plate, a second top plate, and two flexible side edge covers. The first bottom plate and the second bottom plate are partially stacked together, and are suitable for relative movement. The first top plate has a first end and a second end, in which the first end pivots to a side of the first bottom plate away from the second bottom plate. The second top plate has a third end and a fourth end, in which the fourth end pivots to a side of the second bottom plate away from the first bottom plate. The two flexible side edge covers are connected to two side edges of the first top plate and the second top plate and two side edges of the first bottom plate and the second bottom plate.

In an embodiment of the foldable mouse of the present invention, the first top plate further has a first fastening structure disposed at the second end, the second top plate further has a second fastening structure disposed at the third end, and the first fastening structure is suitable for fastening to the second fastening structure. One of the first fastening structure and the second structure is a protruding part, and the other is a recessed part.

In an embodiment of the foldable mouse of the present invention, a material of the flexible side edge covers is foam or rubber.

In an embodiment of the foldable mouse of the present invention, the foldable mouse further includes a circuit board disposed on the first bottom plate, in which the first bottom plate is located on the second bottom plate. Alternatively, the second bottom plate is located on the first bottom plate, and the foldable mouse further includes an overhead rack disposed on the first bottom plate, and the circuit board is disposed on the overhead rack, so that the circuit board is at a distance from the first bottom plate.

In an embodiment of the foldable mouse of the present invention, the third end of the second top plate is rotated relatively about the fourth end to approach the second bottom plate, the second bottom plate is moved relative to the first bottom plate to approach the first end of the first top plate, and the second end of the first top plate is rotated relatively about the first end to be placed on the second top plate, so as to reduce a whole volume of the foldable mouse.

Based on the above, in the foldable mouse of the present invention, the first top plate and the second top plate may relatively approach the first bottom plate and the second bottom plate, and the first bottom plate and the second bottom plate are moved relative to each other to be stacked together, so as to reduce the whole volume of the foldable mouse and facilitate receiving or carrying.

In order to make the aforementioned features and advantages of the present invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
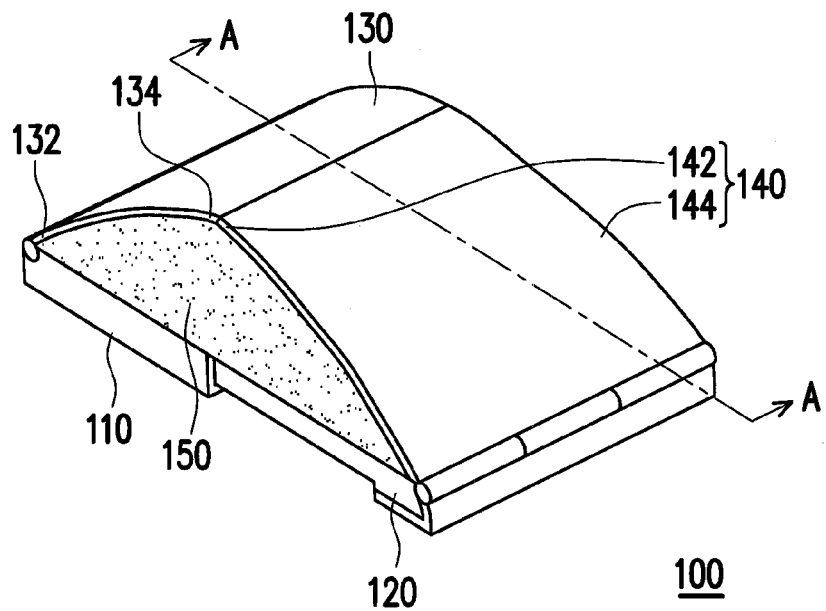
FIG. 1 is a schematic three-dimensional view of a foldable mouse according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
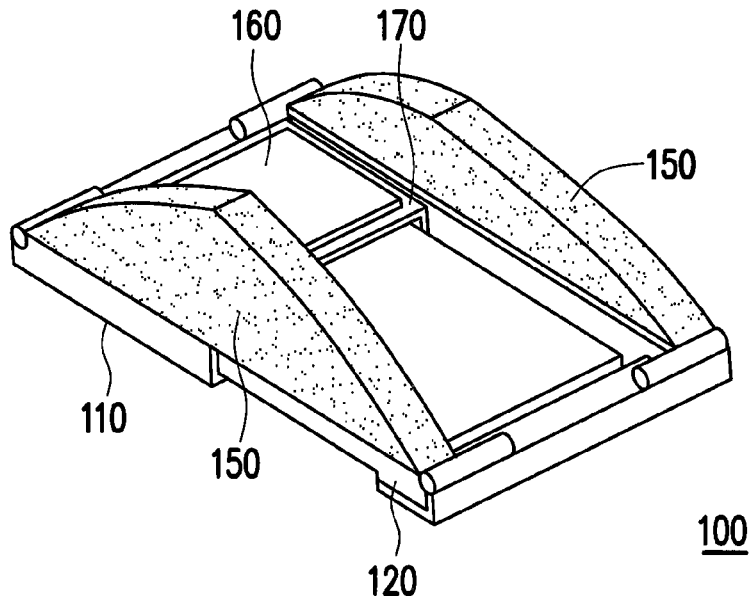
FIG. 2 is a schematic view of the foldable mouse in FIG. 1 without showing a first top plate and a second top plate.
Figure 3:
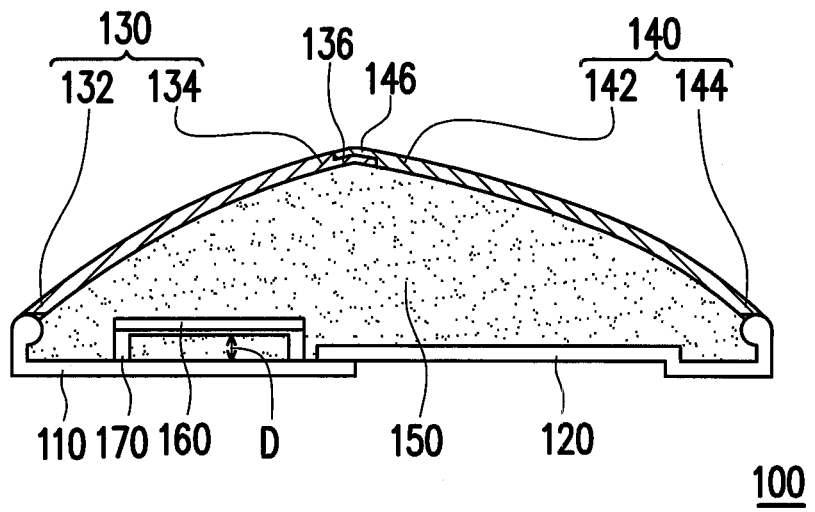
FIG. 3 is a schematic sectional view of the foldable mouse in FIG. 1.

FIG. 1 is a schematic three-dimensional view of a foldable mouse according to an embodiment of the present invention, FIG. 2 is a schematic view of the foldable mouse in FIG. 1 without showing a first top plate and a second top plate, and FIG. 3 is a schematic sectional view of the foldable mouse in FIG. 1 along a section line A-A. Referring to FIGS. 1, 2, and 3 at the same time, the foldable mouse 100 of this embodiment includes a first bottom plate 110, a second bottom plate 120, a first top plate 130, a second top plate 140, and two flexible side edge covers 150. The first bottom plate 110 and the second bottom plate 120 are partially stacked together, and are suitable for relative movement. The first top plate 130 has a first end 132 and a second end 134, in which the first end 132 pivots to a side of the first bottom plate 110 away from the second bottom plate 120. The second top plate 140 has a third end 142 and a fourth end 144, in which the fourth end 144 pivots to a side of the second bottom plate 120 away from the first bottom plate 110. The two flexible side edge covers 150 are connected to two side edges of the first top plate 130 and the second top plate 140 and two side edges of the first bottom plate 110 and the second bottom plate 120.

Based on the above, in order to bear the force of a user applied to the foldable mouse 100 in use, and prevent the whole foldable mouse 100 from being too heavy, the first bottom plate 110, the second bottom plate 120, the first top plate 130, and the second top plate 140 of the foldable mouse 100 are all made of plastic, in which the first top plate 130 further has a first fastening structure 136 disposed at the second end 134, and the second top plate 140 further has a second fastening structure 146 disposed at the third end 142.

In a used state, the first fastening structure 136 and the second fastening structure 146 of the foldable mouse 100 are fastened to each other, in which the first fastening structure 136 is a recessed part, and the second fastening structure 146 is a protruding part. The first top plate 130 and the second top plate 140 fixed together are in an arch shape, so that the user may rest his/her palm on the first top plate 130 and the second top plate 140 when gripping the foldable mouse 100. Persons skilled in the art may change the shape of the first fastening structure 136 and the second fastening structure 146 according to actual requirements. In addition, the foldable mouse 100 of this embodiment further includes a circuit board 160 disposed on the first bottom plate 110, in which the second bottom plate 120 is located on the first bottom plate 110, and a small part of the second bottom plate 120 is stacked on the first bottom plate 110.

Figure 4:
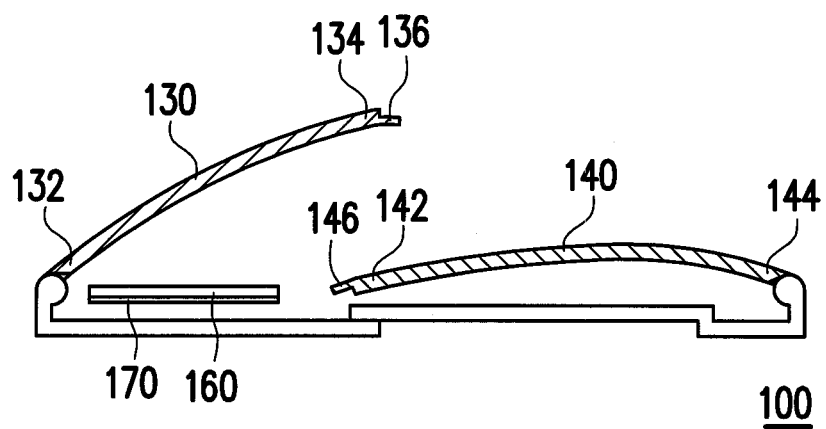
FIGS. 4 to 6 are schematic cutaway views illustrating a process of folding the foldable mouse in FIG. 3 for receiving.
Figure 5:
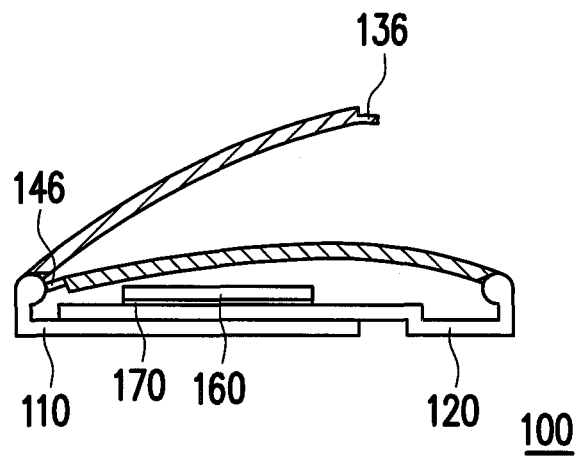
Figure 6:
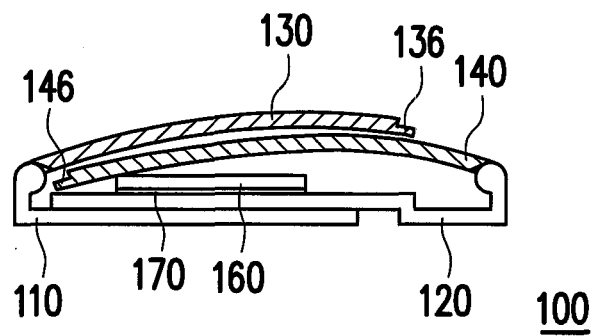

FIGS. 4 to 6 are schematic cutaway views illustrating a process of folding the foldable mouse in FIG. 3 for receiving. It should be noted that, FIG. 3 is a sectional view, so as viewed along the section line A-A of FIG. 1, frame feet of an overhead rack 170 contacting the first bottom plate 110 can be seen, while FIGS. 4 to 6 are cutaway views, so the frame feet of the overhead rack 170 contacting the first bottom plate 110 are not shown in FIGS. 4 to 6. Referring to FIGS. 3 and 4 at the same time, when the user does not want to continue using the foldable mouse 100 of this embodiment and wants to receive the foldable mouse 100, the user may firstly release the fastening between the first fastening structure 136 and the second fastening structure 146, and then rotate the third end 142 of the second top plate 140 relatively about the fourth end 144 to approach the second bottom plate 120.

Next, referring to FIGS. 3 and 5 at the same time, the second bottom plate 120 is moved relative to the first bottom plate 110 to a predetermined position in a direction of approaching the first end 132 of the first top plate 130. At this time, the second top plate 140 is below the first top plate 130, and a large part of the second bottom plate 120 is stacked on the first bottom plate 110. In addition, the foldable mouse 100 may further include an overhead rack 170 disposed on the first bottom plate 110, and the circuit board 160 is disposed on the overhead rack 170, so the circuit board 160 is at a distance D from the first bottom plate 110. Because of the disposal of the overhead rack 170, when the second bottom plate 120 is moved relative to the first bottom plate 110 in the direction of approaching the first end 132 of the first top plate 130, the second bottom plate 120 may pass through the distance D between the circuit board 160 and the first bottom plate 110, thereby avoiding the situation that the circuit board 160 is directly disposed on the first bottom plate 110 so that the second bottom plate 120 is limited by the circuit board 160 and cannot move relative to the first bottom plate 110 to the predetermined position, and prevent that the action for subsequently folding the foldable mouse 100 is affected.

Persons of ordinary skill in the art may also change the implementation of elevating the circuit board 160 according to actual requirements. For example, a rib capable of supporting the circuit board 160 may directly extend from the first bottom plate 110, which can also elevate the circuit board 160.

Then, referring to FIG. 6, the second end 134 of the first top plate 130 is rotated relatively about the first end 132, and the first top plate 130 is placed on the second top plate 140, so that the foldable mouse 100 is folded up, and is in a received state. Particularly, a material of the flexible side edge covers 150 in this embodiment is foam or rubber that is deformable by squeezing. Therefore, when the foldable mouse 100 is in the received state, the flexible side edge covers 150 are deformed by squeezing and have a smaller volume than that before squeezing.

Compared with the foldable mouse 100 in the used state (as shown in FIG. 3), the size of the foldable mouse 100 in the received state (as shown in FIG. 6) is decreased in both thickness and length, so the whole volume of the foldable mouse 100 is reduced, and the foldable mouse 100 is convenient for the user to carry and receive.

Figure 7:
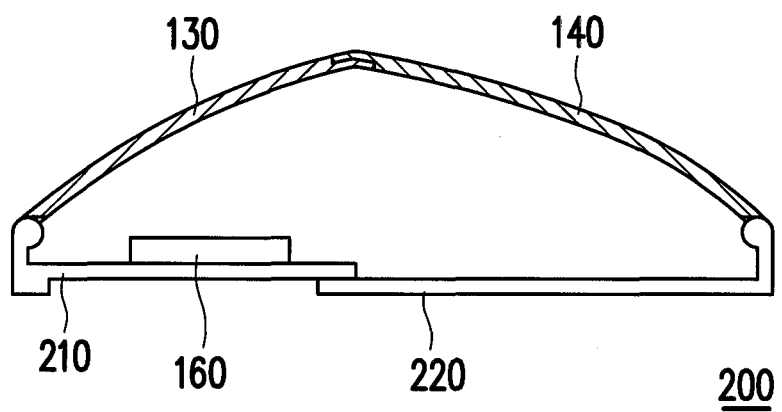
FIG. 7 is a schematic view of a foldable mouse according to another embodiment of the present invention in a used state.
Figure 8:
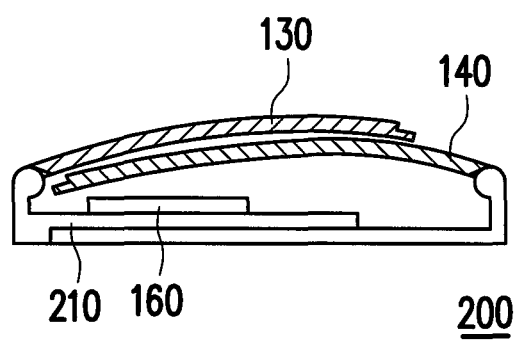
FIG. 8 is a schematic view of the foldable mouse in FIG. 7 in a received state.

FIG. 7 is a schematic view of a foldable mouse according to another embodiment of the present invention in a used state, and FIG. 8 is a schematic view of the foldable mouse in FIG. 7 in a received state. Referring to FIGS. 7 and 8 at the same time, this embodiment is substantially the same as the above embodiment, and the difference lies in that: in the foldable mouse 200 of this embodiment, a first bottom plate 210 is located on a second bottom plate 220, and the circuit board 160 is directly disposed on the first bottom plate 210. In this way, it is not necessary to dispose the overhead rack 170 (as shown in FIG. 3) on the first bottom plate 210, and the number of elements used in the foldable mouse 200 may be reduced, so as to effectively reduce the cost.

To sum up, when the foldable mouse of the present invention is in the received state, the size of the foldable mouse is decreased in both thickness and length, so the whole volume of the foldable mouse is reduced; and the foldable mouse is convenient for the user to carry and receive.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A foldable mouse, comprising:
a first bottom plate and a second bottom plate, wherein the first bottom plate and the second bottom plate are partially stacked together, and are suitable for relative movement;

a first top plate, comprising a first end and a second end, wherein the first end pivots to a side of the first bottom plate away from the second bottom plate;

a second top plate, comprising a third end and a fourth end, wherein the fourth end pivots to a side of the second bottom plate away from the first bottom plate; and two flexible side edge covers, connected to two side edges of the first top plate and the second top plate and two side edges of the first bottom plate and the second bottom plate.

2. The foldable mouse according to claim 1, wherein the first top plate further comprises a first fastening structure disposed at the second end, the second top plate further comprises a second fastening structure disposed at the third end, and the first fastening structure is suitable for fastening to the second fastening structure.

3. The foldable mouse according to claim 2, wherein one of the first fastening structure and the second structure is a protruding part, and the other is a recessed part.

4. The foldable mouse according to claim 1, wherein a material of the flexible side edge covers is foam or rubber.

5. The foldable mouse according to claim 1, further comprising a circuit board disposed on the first bottom plate.

6. The foldable mouse according to claim 5, wherein the first bottom plate is located on the second bottom plate.

7. The foldable mouse according to claim 1, wherein the second bottom plate is located on the first bottom plate, and the circuit board is at a distance from the first bottom plate.

8. The foldable mouse according to claim 7, further comprising an overhead rack disposed on the first bottom plate, wherein the circuit board is disposed on the overhead rack.

9. The foldable mouse according to claim 1, wherein the third end of the second top plate is rotated relatively about the fourth end to approach the second bottom plate, the second bottom plate is moved relative to the first bottom plate to approach the first end of the first top plate, and the second end of the first top plate is rotated relatively about the first end to be placed on the second top plate.

* * * * *